(12) United States Patent
Jeffery

(10) Patent No.: US 7,284,689 B2
(45) Date of Patent: Oct. 23, 2007

(54) LIGHT FIXTURE MANAGEMENT SYSTEM

(76) Inventor: R. Clark Jeffery, 980 Finley Avenue, Ajax, Ontario (CA) L1S 3V2

( * ) Notice: Subject to any disclaimer, the term of this patent is extended or adjusted under 35 U.S.C. 154(b) by 29 days.

(21) Appl. No.: 10/812,951

(22) Filed: Mar. 31, 2004

(65) Prior Publication Data

US 2004/0178257 A1    Sep. 16, 2004

Related U.S. Application Data

(63) Continuation of application No. 09/562,852, filed on May 1, 2000, now abandoned.

(51) Int. Cl.
*G06F 17/00* (2006.01)
(52) U.S. Cl. ........................ 235/375; 235/487
(58) Field of Classification Search ................ 235/375, 235/385, 462.01, 470, 487; 702/182
See application file for complete search history.

(56) References Cited

U.S. PATENT DOCUMENTS

| | | | |
|---|---|---|---|
| 4,550,246 A | 10/1985 | Markman | |
| 5,120,942 A | 6/1992 | Holland et al. | |
| 5,471,042 A | 11/1995 | Kirkeby et al. | |
| 5,519,878 A | 5/1996 | Dolin, Jr. | |
| 5,602,377 A | 2/1997 | Beller et al. | |
| 5,610,596 A * | 3/1997 | Petitclerc | 340/825.23 |
| 5,635,693 A | 6/1997 | Benson et al. | |
| 5,664,113 A | 9/1997 | Worger et al. | |
| 5,724,261 A | 3/1998 | Denny et al. | |
| 5,794,213 A | 8/1998 | Markman | |
| 5,803,906 A | 9/1998 | Pratt et al. | |
| 5,856,931 A * | 1/1999 | McCasland | 702/182 |
| 6,031,621 A | 2/2000 | Binder | |
| 6,480,699 B1 * | 11/2002 | Lovoi | 455/41.2 |
| 6,731,079 B2 * | 5/2004 | Andersen | 315/312 |

FOREIGN PATENT DOCUMENTS

| | | |
|---|---|---|
| CA | 1261470 | 9/1989 |
| CA | 2027639 | 7/1995 |
| JP | 10164627 A | 6/1998 |

* cited by examiner

*Primary Examiner*—Michael G. Lee
*Assistant Examiner*—Kumiko C. Koyama
(74) *Attorney, Agent, or Firm*—Dimock Stratton LLP; Jenna L. Wilson

(57) ABSTRACT

A light fixture management system which tracks the location, history and operating characteristics of light fixtures in a structure or a group of structures and surrounding premises. Each light fixture is assigned indicia, for example a bar code, which is stored in a database in association with details of the light fixture. An observer charged with identifying light fixtures in need of repair carries a portable scanner. The observer scans the bar code associated with any light fixture in need of repair and optionally enters into the bar code scanner any observable problem. The scanned information is downloaded into a computer, which may be programmed to establish a repair route for fixtures identified as being in need of repair, based on the locations of the light fixtures and types of problems identified by the observer. Reports can be generated as required with any other desired information. The invention considerably simplifies the task of tracking light fixtures and substantially increases the efficiency and effectiveness of repair personnel. The master database may also contain the location of the circuit breaker which controls power to each fixture, to enable repair personnel to quickly locate and deactivate the circuit if necessary for a particular type of repair.

19 Claims, 2 Drawing Sheets

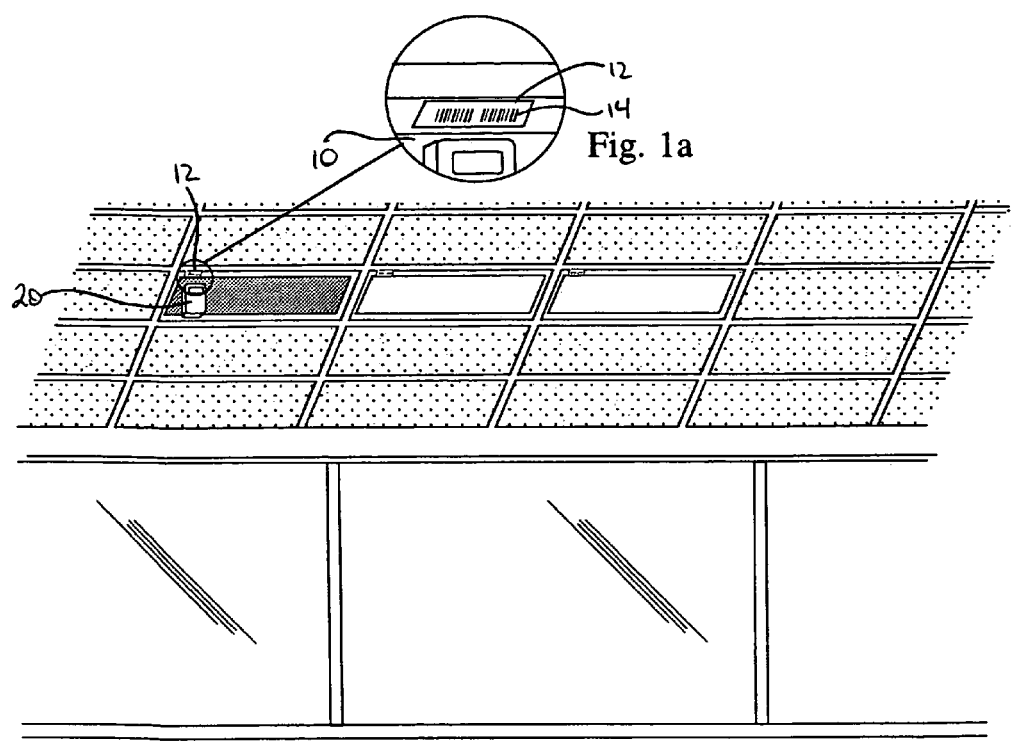
Fig. 1a
Fig. 1
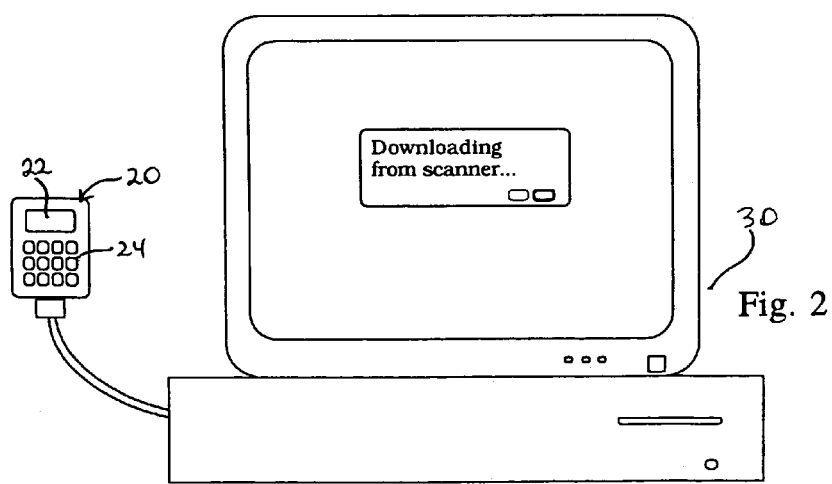
Fig. 2

Lighting Activity Report
Sorted by Group

| Code Number | Date (MM/DD/YYYY) | Floor Number | Group Number | Number of Lamps | Number of Ballasts | Work Order Number | LAMP Group Percent Annual Failure Rate |
|---|---|---|---|---|---|---|---|
| abc1234567898 | 02/08/00 | 68 | 1 | 2 | | 4421 | |
| abc1234567899 | 03/08/00 | 68 | 1 | | 1 | 3321 | |
| abc1234567916 | 03/08/00 | 66 | 1 | 2 | | 3321 | |
| abc1234567917 | 04/08/00 | 66 | 1 | 2 | | 7765 | |
| abc1234567934 | 08/08/00 | 65 | 1 | 2 | | 6654 | |
| abc1234567935 | 26/07/00 | 63 | 1 | 2 | | 6648 | |
| abc1234567952 | 07/07/00 | 63 | 1 | 2 | | 8843 | |
| abc1234567953 | 05/08/00 | 63 | 1 | | | 2299 | 1.00% |
| abc1234567897 | 12/07/00 | 47 | 2 | 2 | | 2314 | |
| abc1234567900 | 03/08/00 | 47 | 2 | 2 | | 4421 | |
| abc1234567915 | 03/07/00 | 46 | 2 | | 1 | 4432 | |
| abc1234567918 | 30/08/00 | 45 | 2 | 2 | | 7789 | |
| abc1234567933 | 03/07/00 | 44 | 2 | 2 | | 7754 | |
| abc1234567936 | 21/07/00 | 43 | 2 | 2 | | 880? | |
| abc123456??? | ??/??/?? | | 8 | 2 | | 2??? | 4.50% |
| abc1234567942 | 04/08/00 | 60 | 8 | | | 6633 | |
| abc1234567945 | 26/08/00 | 59 | 8 | | | 9123 | |
| abc1234567890 | 30/07/00 | 58 | 8 | | | ???? | 3.15% |
| abc1234567907 | 23/08/00 | 54 | 9 | 2 | | 1122 | |
| abc1234567908 | 01/08/00 | 54 | 9 | 2 | | 6666 | |
| abc1234567925 | 30/09/00 | 53 | 9 | 2 | | 5543 | |
| abc1234567926 | 21/07/00 | 53 | 9 | 2 | | 8855 | |
| abc1234567943 | 05/08/00 | 7 | 9 | 2 | | 8844 | |
| abc1234567944 | 22/08/00 | 6 | 9 | 2 | | 9988 | |
| abc1234567??? | 21/08/00 | | | | | ???? | 1.20% |
| TOTAL | | | | 104 | 13 | | |

TOTAL ANNUAL FAILURE RATE:
Total System: LAMPS 3,000 3.47%
Total System: BALLASTS 1,500 0.87%

Fig. 3

LIGHT FIXTURE MANAGEMENT SYSTEM

CROSS-REFERENCE TO RELATED APPLICATIONS

This application is a continuation of application Ser. No. 09/562,852, filed May 1, 2000 now abandoned.

FIELD OF THE INVENTION

The present invention relates to lighting. In particular, the invention relates to a light fixture management system which facilitates the tracking, maintenance and repair of light fixtures in a building, complex or group of structures.

BACKGROUND OF THE INVENTION

Industrial and commercial buildings and multi-site complexes may have tens of thousands of light fixtures of many different types, which require periodic maintenance and repair. Similarly, the maintenance and repair of light fixtures in a group of structures spread over a wide geographic area, for example a retail chain operation which may include hundreds of satellite stores in different territories, may be the responsibility of a single central office.

Presently the maintenance and repair of light fixtures in these types of situations is carried out on an ad hoc basis. A tenant or other occupant of the structure identifies a fixture in need of repair within a suite, or an employee of the building manager, for example a security guard, identifies a light fixture in need of repair in a suite or common area. The property manager is notified and issues a work order, which is delivered to the maintenance department and given to repair personnel to undertake the repair.

No particular consideration is given to carrying out light fixture maintenance or repairs in an orderly fashion, tracking the maintenance histories of light fixtures to identify latent problems or defects, or difficulties that repair personnel may encounter in effecting a repair such as problems identifying the circuit supplying power to a particular light fixture so that it can be deactivated to effect a repair. At best this results in an inefficient use of labour, and potentially parts inventory shortages. In other cases the property manager may end up paying the cost of repairing fixtures or components that are still under warranty, or may pay undue costs to maintain a defective fixture because the defect is not apparent without an overview of the repair history of the fixture.

The repair and maintenance of light fixtures in large commercial structures and complexes is thus presently a substantially random process. This leads to a number of disadvantages, including an inefficient use of repair personnel, haphazard replacement parts inventory management, inability to identify problematic fixtures and components, and attendant unnecessary costs associated with all of these. In a building or complex with thousands of light fixtures, these extra costs can be substantial.

Inventory control systems which utilize scanners such as bar code readers to record and track inventory are known in the prior art. For example, U.S. Pat. No. 5,664,113 issued Sep. 2, 1997 to Worger et al describes a working asset management system and method for tracking a working asset; Canadian patent No. 1,261.470 issued Sep. 26, 1989 to Markman describes a system and method for the control of dry cleaning articles; and Canadian patent No. 2,027,639 issued Jul. 4, 1995 to Inui et al teaches a parts supply inventory management system. U.S. Pat. No. 5,803,906 issued Sep. 8, 1998 to Pratt et al, which is incorporated herein by reference, teaches a method and system for tracking animal health histories and related information. In this system, animals such as cattle are tagged with a code related to records containing defining characteristics and a health history of each particular animal. A bar code scanner is used to scan the tag, which communicates the identity of the animal to a computer, to facilitate the retrieval of information regarding the health history of the animal.

However, all these systems involve mobile inventory. Optical scanners are used to identify items in the inventory, which can be matched with records for tracking purposes. But the inventory itself is movable, and the orderly management of the inventory is dependent upon this mobility.

Light fixtures present a peculiar problem, because they are immovable. Thus, an orderly management of light fixtures must take into account their fixed locations. Further, the wide variety of fixtures which may be maintained in any particular structure or complex raises parts inventory control problems, both in terms of stocking an adequate supply of parts and in terms of ensuring that the specific parts and components required for specific light fixtures in need of maintenance or repair are on hand. Additionally, efficient management of the light fixtures requires that the arrangement of electrical circuits controlling the various light fixtures be taken into account.

SUMMARY OF THE INVENTION

The present invention provides a light fixture management system which tracks the location, history and operating characteristics of light fixtures in large industrial and commercial structures and multi-site complexes, including retail malls and shopping centers, or in a group of structures spread over a wide geographic area such as a retail chain operation. In the preferred embodiment every light fixture within and on the structures and the surrounding premises is assigned indicia, for example a bar code, which is stored in a database in association with details regarding the date of installation, fixture type, bulb type, ballust type, warranty expiry date, prior repair history, electrical circuit and any other pertinent information.

According to the invention an observer charged with identifying light fixtures in need of repair, which may for example be a building electrician or caretaker, or a security guard or night watchman who normally makes rounds through the structure or complex for security purposes, carries a portable scanner, preferably with a keypad allowing additional information to be entered manually. When a light fixture in need of repair is observed, the observer scans the bar code associated with the light fixture, which may be adhered to an inconspicuous spot on or near the fixture or otherwise somehow physically associated with the fixture.

In the preferred embodiment the observer also enters into the bar code scanner any observable information regarding the repair problem, to the extent that the problem can be identified. At the end of the observer's rounds, the scanned information is downloaded into a computer, for example a personal computer (PC). The computer may be programmed to establish a repair route for fixtures identified as being in need of repair, based on the locations of the light fixtures and types of problems identified by the observer. The repair route can form part of a maintenance report which may also indicate what type bulb or other component is required for the specific light fixture requiring maintenance or repair, whether the fixture is still under warranty, whether the fixture has a history of problems, and any other desired information.

The invention accordingly considerably simplifies the task of tracking light fixtures in a structure or group of structures and their surrounding premises, and substantially increases the efficiency and effectiveness of repair personnel. By allowing maintenance personnel to generate a repair route which minimizes travel time, a much greater number of repairs can be effected using the system of the invention as opposed to the conventional, ad hoc repair scheduling presently used in and around such structures and complexes.

In a preferred embodiment of the invention the master database contains a maintenance repair history of each light fixture, which helps to identify problematic fixtures, and identifies the location of the circuit breaker which controls power to the fixture, to enable repair personnel to quickly locate and deactivate the circuit if necessary for a particular type of repair. The latter advantage can be particularly useful in the case of emergency lighting, which is often wired to a circuit breaker on a different floor in a multi-unit structure.

With this inventory and repair information stored in the master database, reports can be generated periodically in any desired format, for tracking expenses, tenant billing, repair effectiveness and efficiency, component quality and so on.

These and other advantages will be apparent from the description which follows.

The present invention thus provides a light fixture management system, comprising a plurality of labels each containing unique indicia, a portable reader for reading the indicia on the labels, a microprocessor appliance comprising a database, for receiving information collected by the reader and associating the unique indicia with corresponding information in the database, wherein when the plurality of labels are each associated with one of a plurality of light fixtures, the microprocessor appliance can generate a report with information specific to light fixtures associated with the labels read by the reader.

The present invention further provides a method of managing a plurality of light fixtures, each light fixture being associated with one of plurality of labels, each label containing unique indicia, comprising the steps of: a. reading the indicia on the labels associated with light fixtures observed to be in need of repair or maintenance and storing information corresponding to the indicia, b. conveying the stored information corresponding to the indicia to a microprocessor appliance comprising a database, and c. generating a report with information specific to light fixtures associated with the labels read by the reader.

A further aspect of the method includes the step of downloading information from the database to a master database at another geographic location

BRIEF DESCRIPTION OF THE DRAWINGS

In drawings which illustrate by way of example only a preferred embodiment of the invention, FIG. 1 is a perspective view of a light fixture being scanned by a portable optical character reader, FIG. 1a is an enlarged perspective view of the label in FIG. 1, FIG. 2 is a schematic representation of information being downloaded from the optical character reader to a computer, and FIG. 3 is an example of an embodiment of a lighting activity report generated according to the invention.

DETAILED DESCRIPTION OF THE INVENTION

FIG. 1 illustrates the information collection component of the system of the invention using the example of an existing light fixture 10 in a commercial building, which may be any type of light fixture 10. A label 12 containing unique indicia, in the example shown a conventional bar code 14, is associated with the light fixture 10 by being fixed on or in the vicinity of the light fixture 10. In the embodiment shown the label 12 is affixed to the frame of the light fixture 10, however it will be appreciated that the precise location of the label 12 relative to the light fixture 10 is a matter of selection and convenience.

Preferably the label 12 is accessible to an observer without disassembling the light fixture 10, although the invention also contemplates an embodiment in which the label 12 is concealed within the light fixture 10. The label 12 shown is a conventional self-adhesive label, preferably of the foil-laminate type for durability, however the label 12 may be made of any suitable material and adhered to or near the light fixture 10 in any suitable fashion, or the indicia may be printed directly onto the light fixture 10, for example in a new installation, in which case the indicia itself forms the label.

A plurality of light fixtures 10 in and around the building or complex and its surrounding premises are labelled as described above. A portable reader is provided for reading the indicia 14 on the labels 12, in the preferred embodiment a conventional bar code scanner 20 which optically scans the bar code 14 and stores the scanned information in memory. In other embodiments the reader may comprise any other suitable device, for example a magnetic scanner, capable of reading a magnetic bar code, strip or other indicia unique to the light fixture 10.

In the preferred embodiment the bar code scanner 20 comprises a display 22 and a keypad 24, allowing the observer to enter alphanumeric information into the scanner 20 relating to the current scanned light fixture 10. For example, the observer may enter "BULB OUT" to indicate a burned out light tube, or short alphanumeric codes may be assigned to various repair tasks to minimize the amount of data manually entered into the reader 20. In alternative embodiments the bar code scanner 20 may by a so-called "pen scanner" with no key pad, in which case the scanning operation merely identifies light fixtures 10 in need of repair. This information is stored in memory in the scanner 20.

FIG. 2 illustrates the processing component of the system of the invention. A microprocessor appliance such as a personal computer (PC) 30 comprises a database for receiving information collected by the scanner 20. The database preferably provides fields for many different types of information relating to the light fixtures 10, including but not limited to date of installation, fixture type, bulb type, ballust type, warranty expiry date, prior repair dates, electrical repair room in which the controlling circuit breaker is located, electrical panel and electrical circuit, and so on. In the database the information relating to each particular light fixture 10 is contained in a record referenced by the unique bar code 14 on the label 12 associated with the respective light fixture 10.

With this information the computer 30 can generate a report 32 setting out information specific to light fixtures 10 associated with the labels 12 read by the scanner 20. Reports 32 may be custom tailored to the requirements of the property manager or other user, setting out only such information as is required for the purpose of the report. For example, an expense report 32 may be generated for common areas with warranty information and repair history, whereas a tenant expense report might also include information regarding the location of the fixture 10. The amount and types of information which can be included in a report 32 is limited only by the types of information stored in the database, and the frequency with which such reports are generated is in the discretion of the user.

In the preferred embodiment the computer 30 is programmed to establish a repair task route for fixtures 10 identified by the observer as being in need of repair, which is set out in a maintenance report 32 in the nature of a work order. This repair task route is based on the locations of the light fixtures 10 corresponding to the bar codes scanned by the scanner 20 during an observation run. For example, FIG. 3 illustrates a representative Lighting Activity Report in which the previously downloaded fixtures 10 in need of repair are sorted by group, each group corresponding to a specific location in the structure or surrounding premises.

The types of problems identified by the observer which have been manually entered into the scanner 20 can be identified in the maintenance report 32, along with specific information regarding the type of bulb or other component required to effect the repair. This allows repair personnel to ensure that the specific components required for the light fixtures 10 identified in the maintenance report 32 are on hand when needed.

Even where a problem has not been identified for a scanned fixture 10, the 'fixture type' information in the database can serve as a reference for the type of component which might be required to repair that particular fixture 10. This saves time by ensuring that repair personnel are properly equipped to maintain and repair all scanned fixtures 10, and avoids wasted time returning to a storeroom to retrieve inventory and the stocking of unnecessary components.

The repair task route can alternatively be generated manually based on a list of the fixtures 10 identified in the scan operation. Whether manually- or computer-generated, the most efficient route for repairing the plurality of light fixtures 10 identified in the scan operation can be created from the information stored in the database. Moreover, any special requirements for particular fixtures 10 may be appended to the information for each light fixture 10 in the database. For example, an extension ladder which might be required to reach an otherwise inaccessible fixture 10, can be brought along by repair personnel based on an appropriate annotation in the maintenance report 32.

In operation, an observer charged with identifying light fixtures 10 in need of repair, for example a security guard or night watchman, carries the portable scanner 20 on his or her normal rounds. When a light fixture 10 in need of repair is observed, the observer scans the bar code 14 associated with the observed light fixture 10. In the preferred embodiment, using the keypad 24 the observer enters into the bar code scanner 20 any observable information regarding the repair required.

When this information collection operation is complete, the scanner information is downloaded into the computer 30, which adds the scanned information to the database record for each respective scanned light fixture 10 by associating the scanned bar codes 14 with the bar code information stored in the database.

The computer 32 may then generate a maintenance report with an optimized repair task route, setting out the supplies that will be required, any special or unusual circumstances relating to specific fixtures 10, and the location of the circuit breaker which controls power to each fixture 10. The latter information allows repair personnel to quickly locate and deactivate the correct circuit if necessary for a particular type of repair, which can be particularly useful in the case of emergency lighting or other secondary light fixtures which may be fed by a circuit controlled by a circuit breaker on a different floor or in a different part of the structure or premises.

With the inventory and repair information stored in the database on an ongoing basis, reports 32 can be generated with any desired frequency and in any desired format, for tracking expenses, billing, repair effectiveness and efficiency, fixture and component quality, and for any other purpose.

The system and method of the invention can be applied over a wide geographic area, for example in a retail application in which an enterprise maintains a head office and a number of satellite stores, which may for example be warehouse-type outlets that have significant lighting requirements. Frequently such retail operations contract lighting maintenance to a lighting service company, which services light fixtures 10 on an "on-call" basis or a stipulated timetable periodic inspection basis, or some combination of the two. The lighting service company similarly repairs and maintains lighting fixtures 10 in an ad hoc fashion, using floor layouts and reflected ceiling plans for the various outlets.

According to the invention, lighting information scanned at the individual retail outlets may be downloaded by the retail outlets to a host server at the head office (or other designated location), since this communication link typically already exists in modem retail businesses, and the information can thus be maintained in a master database. Thus, lighting information for an entire chain of outlets can be accessed from the central server on a real-time basis, facilitating both maintenance and analysis of lighting fixtures 10 as described above and substantially reducing the number of maintenance calls required from the lighting service company.

A preferred embodiment of the invention having been thus described by way of example, variations and modifications will be apparent to those skilled in the art. The invention includes all such variations and modifications as fall within the scope of the appended claims.

I claim:

1. A light fixture management system, comprising
a plurality of labels each containing unique indicia,
a portable reader for reading the indicia on the labels,
a microprocessor appliance comprising a database, for receiving information collected by the reader corresponding to indicia read by the reader, and associating the received information with corresponding information in the database, the database comprising information relating to a plurality of light fixtures comprising the locations of the plurality of light fixtures and supplies relating to the plurality of light fixtures,
wherein when the plurality of labels are each physically associated with one of the plurality of light fixtures and the labels physically associated with light fixtures identified as being in need of repair or maintenance are read by the reader, the microprocessor appliance is configured to generate a report with information specific to the identified light fixtures the report comprising a repair task route based on relative locations of the identified light fixtures, specifying a sequence of light fixture maintenance based on the relative locations of the identified light fixtures and further identifying supplies required for the identified light fixtures.

2. The light fixture management system of claim 1 wherein the report further comprises information relating to special requirements relating to specific ones of the identified light fixtures.

3. The light fixture management system of claim 1 in which the report further comprises information relating to a circuit breaker controlling power to each identified light fixture.

4. The light fixture management system of claim 1 in which the portable reader comprises a bar code scanner.

5. The light fixture management system of claim 4 in which the bar code scanner comprises a keypad for manually entering information into the scanner.

6. The light fixture management system of claim 1 wherein the light fixtures identified as being in need of repair or maintenance are identified by an observer operating the reader.

7. The light fixture management system of claim 1 in which the information in the database further comprises repair history information for each light fixture.

8. The light fixture management system of claim 1 in which the information in the database further comprises warranty information for each light fixture.

9. The light fixture management system of claim 1, wherein the supplies relating to the plurality of light fixtures comprised in the database includes a fixture type and a bulb type for each of the plurality of light fixtures, and the supplies identified in the report generated by the microprocessor appliance include a fixture type and a bulb type for each of the identified light fixtures.

10. A method of managing a plurality of light fixtures, each light fixture being physically associated with one of plurality of labels, each label containing unique indicia, comprising the steps of:

reading the indicia on the labels physically associated with light fixtures observed to be in need of repair or maintenance and storing information corresponding to the indicia, conveying the stored information corresponding to the indicia to a microprocessor appliance comprising a database, wherein the database comprises information relating to the plurality of light fixtures comprising the locations of the plurality of light fixtures and supplies relating to the plurality of light fixtures, and generating a report using the microprocessor appliance with information specific to light fixtures physically associated with the labels thus read, the report comprising a repair task route based on relative locations of the light fixtures physically associated with the labels thus read, the report specifying a sequence of fixture maintenance based on the relative locations of the light fixtures and further identifying supplies required for the light fixtures associated with the labels thus read.

11. The method of claim 10 wherein the report further comprises information relating to special requirements relating to specific ones of the light fixtures physically associated with the labels thus read.

12. The method of claim 10 in which the report contains information relating to a circuit breaker controlling power to each light fixture physically associated with the labels thus read.

13. The method of claim 10 in which the indicia on the labels is read by a bar code scanner.

14. The method of claim 13 in which the bar code scanner comprises a keypad an further comprising the step of manually entering information into the scanner relating to an observed repair requirement.

15. The method of claim 10 wherein the light fixtures observed to be in need of repair or maintenance are identified by an observer carrying out the step of reading the indicia.

16. The method of claim 10 wherein the database further comprises repair history information for each light fixture.

17. The method of claim 10 wherein the database further comprises warranty information for each light fixture.

18. The method of claim 10 wherein the supplies relating to the plurality of light fixtures comprised in the database includes a fixture type and a bulb type for each of the plurality of light fixtures, and the supplies identified in the report generated using the microprocessor appliance includes a fixture type and a bulb type for each of the light fixtures associated with the labels thus read.

19. The method of claim 10 including, after the step of conveying the stored information, the step of downloading the conveyed information from the database to a master database at another geographic location.

* * * * *